United States Patent Office 3,606,239
Patented Sept. 20, 1971

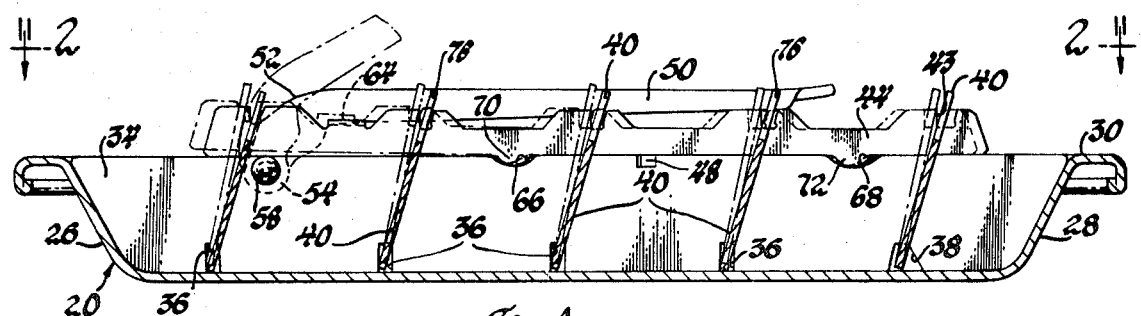
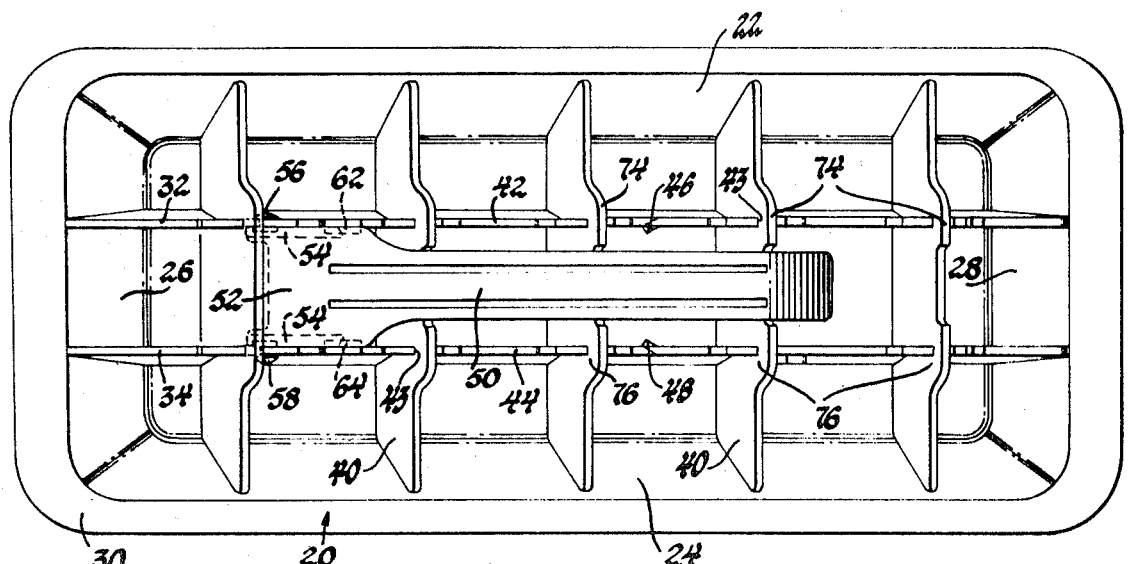
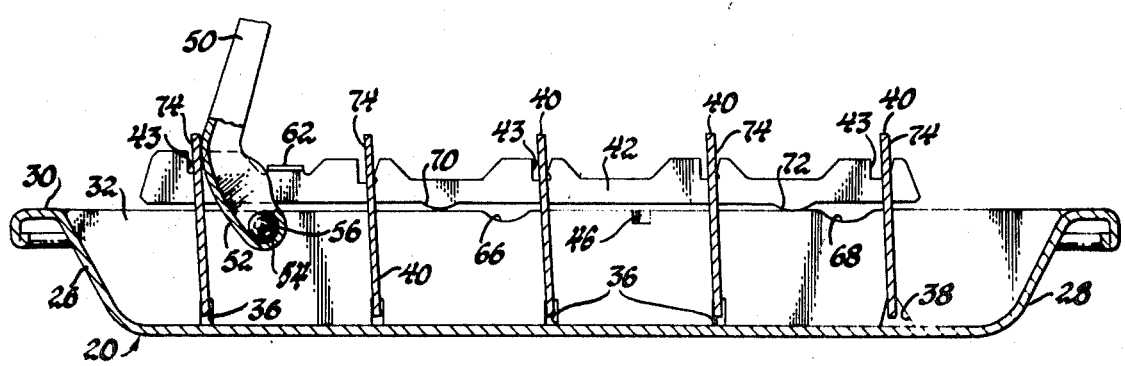

3,606,239
FREEZING GRID WITH CAM LIFT
Joe P. Pietrzak, Kettering, Ohio, assignor to General
Motors Corporation, Detroit, Mich.
Filed Mar. 19, 1970, Ser. No. 20,937
Int. Cl. B28b 7/10; B29c 1/00
U.S. Cl. 249—72                                    8 Claims

ABSTRACT OF THE DISCLOSURE

In the preferred form, an ice tray grid has fore and aft movable transverse walls on opposite sides of a pair of lower longitudinal walls which are actuated for ice ejection by being connected with a pair of longitudinally movable upper operating members slidable on the lower longitudinal walls. In each opposite end of the top of each of the lower longitudinal walls is a curved ramp recess, and a cooperating curved cam projection is provided in the bottom of each end of the operating members. These projections and recesses are nested in the normal freezing position and cam to lift the operating members and the transverse walls in conjunction with the relative movement from the initial freezing position to the ejecting position.

---

The Reeves Pat. 2,444,789, issued July 6, 1948, and the waxing of the surfaces thereof provided a great advance in ejecting frozen liquid from freezing trays. These trays with the improvement in the coating continued in popularity for many years. However, even with the improvement in the coatings, the ease of ejection diminished with the deterioration of the coating under continued use and washing.

It is an object of this invention to increase the ease of the ejecting operation of the grids and freezing devices by forcing the lifting of the transverse walls or partitions relative to the longitudinal wall or walls particularly in conjunction with the longitudinal ejecting movement of the transverse walls relative to the longitudinal walls.

Further objects and advantages of the present invention will be apparent from the following description, reference being had to the accompanying drawings, wherein preferred embodiments of the present invention are clearly shown.

In the drawings:

FIG. 1 is a longitudinal vertical sectional view of a freezing tray and grid showing the freezing position in full lines and an initial ejecting position in dot and dash lines;

FIG. 2 is a top view of the freezing tray and grid shown in FIG. 1; and

FIG. 3 is a longitudinal vertical sectional view similar to FIG. 1 but showing the grid in the terminal ejection position.

Referring now to the drawings, there is shown a freezing tray or container 20 preferably of aluminum or suitable plastic having outwardly diverging side walls 22 and 24 and outwardly diverging end walls 26 and 28 and an outwardly extending downwardly curled rim 30. Although my invention is applicable to grids with single longitudinal walls or grids with many longitudinal walls, for the purpose of illustrating my invention I have shown the invention applied to the familiar twin bar type of grid incorporating two lower longitudinal walls 32 and 34 of aluminum or plastic which are tilted inwardly and have along their lower edges a series of spaced notches 36 with the rear notch 38 being V-shaped. Loosely mounted upon these lower longitudinal walls 32 and 34 are a series of spaced transverse walls or partitions 40 having upwardly extending holes or slots receiving the lower longitudinal walls 32 and 34 with the webs at the bottom of the slots fitting into the notches 36 and 38.

Also extending through the upper portions of the slots and held thereby in position on top of the lower longitudinal walls 32 and 34 are a pair of operating bars 42 and 44 which normally slide on top of the lower walls 32 and 34 and are prevented from falling off by the inturned projections 46 and 48 and the transverse walls 40. The freezing position with the handle down is shown in full lines in FIG. 1 and also in FIG. 2. For the ejecting operation there is provided a pressed aluminum handle 50 provided with a front end 52 in which the top is curved downwardly toward the front transverse wall so as to form a cam surface. The front portion also has downwardly turned ears 54 through which pass rivets 56 and 58 for riveting the ears 54 to the lower longitudinal walls 32 and 34 for providing a pivotal axis on the lower longitudinal walls and also for assisting in holding the lower longitudinal walls in the proper spaced relationship. The holes for the rivets in the ears 54 are sufficiently large to permit free pivoting of the handle 50.

The operating bars 42 and 44 are provided with V-shaped notches 43 for each of the transverse walls 40 which receive the webs 74 and 76 at the tops of the rectangular slots in the transverse walls 40. These notches 43 are of increasing width from the front to the rear of the grid and tray to provide sequential front to rear engagement of the transverse walls 40 as in Pat. 2,444,789. The camming of the end 52 of the handle 50 against the front transverse wall 40 pulls the operating bars 42 and 44 forwardly as the handle 50 is lifted to the dot-dash position shown in FIG. 1 so as to tilt in sequence from front to rear the upper portions of the transverse walls 40 forwardly to the dot-dash line position to initiate the ejecting operation for releasing the ice cubes or cubes of frozen liquid from the grid and the tray or pan 20. The ejecting operation normally terminates with the handle 50 and the grid in the position shown in FIG. 3. The operating bars 42 and 44 are also provided with inturned projections 62 and 64 at the top behind the ears 54 to be engaged by the rear portion of the ears 54 to assist in returning the transverse walls 40 and the operating bars 42 and 44 to their rear most initial freezing position after the ejecting operation. While this type of freezing device has been very popular for many years there has always been an increase in the force required as the ice releasing wax coating on the tray or pan and grid diminishes in effectiveness.

According to my invention, to improve the ease of operation of the grid and particularly the handle 50 under all circumstances, in each of the opposite ends of the lower longitudinal walls 32 and 34 along the upper edge thereof, I provide two spaced apart arcuate cam recesses or ramps 66 and 68. Normally nesting in these recesses in the freezing position are two part arcuate camming projections 70 and 72 extending downwardly from the bottoms of the operating bars 42 and 44 into the recesses 66 and 68 as shown in FIGS. 1 and 2. The rear recesses 68 preferably are slightly longer than the front recesses 66 to provide a wider spacing between the cams 72 and the front of the recesses 68 so that the engagement of the projections 70 with the ramps in the front portion of the front recesses 66 takes place before the projections 72 engage the ramps in the front portion of the rear recesses 68 so that the front ends of the operating bars 42 and 44 are first lifted and after reaching the maximum lift, the rear end is slowly lifted. Thus, the maximum force required to overcome the camming effect is better distributed and consequently substantially reduced. By this sequential engagement of the cams 70 and 72 with the recesses 66 and 68, the transverse walls 40 are lifted in sequence from front to rear substantially as they are engaged sequentially and tilted forward by the operating bars 42 and 44.

The forward movement of the operating bars 42 and 44 with the forward movement of the upper portions of the transverse walls 40, entail an excellently distributed double progressive lifting operation of both the operating bars 42, 44 and the transverse walls 40 by the sequential double progressive cam lift effect of the projections 70 and 72 upon the front halves of the recesses 66 and 68 which provides a fore and aft tilting or rocking of the operating bars as a result of the sequential double cam lift. Since the notches 43 in the operating bars 42 and 44 sequentially engage the webs 74 and 76 and sequentially lift them as they are being moved forward, there is a combined tilting and lifting effect of the transverse walls 40 which increases the shear force between the transverse walls and the ice or frozen liquid to more effectively release the ice or frozen liquid from the grid and tray with reduced effort. This lifting of the transverse walls 40 also minimizes the wear upon the wax coating upon the bottom of the tray 20 adjacent their bottom edges. Thus, the grid and tray may be used for a longer period of time, even though the wax coating has become less effective in effecting the release of the ice or frozen liquid from the grid and tray.

While the embodiments of the invention as herein disclosed constitute preferred forms, it is to be understood that other forms might be adopted.

I claim:

1. In a freezing device, a mold element comprising a longitudinal supporting wall member and a plurality of transverse partition members mounted for movement thereon, means for moving said transverse partition members longitudinally relative to said longitudinal member, wherein the improvement comprises means for moving said transverse members transversely relative to said longitudinal wall member during said longitudinal movement.

2. In a freezing device, a mold element comprising a longitudinal supporting wall member and a plurality of transverse partition members mounted for movement thereon, means for sequentially tilting said transverse partition members longitudinally relative to said longitudinal member, wherein the improvement comprises means for sequentially lifting said transverse members transversely relative to said longitudinal wall member substantially as they are tilted sequentially.

3. In a freezing device, a partition forming a longitudinal wall extending longitudinally of the device and a plurality of spaced apart partitions extending transversely to and along the length of said longitudinal partition, said transverse partitions forming walls on each side of said longitudinal partition, said transverse partitions being mounted for sliding movement along and relative to said longitudinal partition, an element for engaging progressively from one end to the other end of the device and imparting a sliding movement to said transverse partitions lengthwise of said longitudinal partition, wherein the improvement comprises providing said element with means for sequentially engaging said transverse partitions and sequentially lifting them away from said longituidnal partition during said sliding movement.

4. A grid for a freezing tray including a longitudinal wall structure comprising a lower partition wall member and an upper operating member movable relative thereto, a plurality of transverse walls loosely mounted on and interlocked with said longitudinal wall structure, said transverse walls being spaced lengthwise along longitudinal wall structure and extending on both sides of said longitudinal wall structure to form compartments on either side of the longitudinal wall structure, said upper operating member having formed therein a plurality of notches embracing the upper edges of said transverse walls, means for moving said operating member relative to and lengthwise of said lower partition member to cause the side walls of the notches to engage and move said transverse walls lengthwise of said lower partition member, wherein the improvement comprises means for initially lifting one end and thereafter lifting the other end of said upper operating member relative to said lower partition member in response to the relative lengthwise movement for engaging and sequentially lifting said transverse walls relative to said lower partition member.

5. A grid for a freezing tray including a longitudinal wall structure comprising a lower upwardly extending partition wall member and an upper operating member movable relative to said lower member, a plurality of transverse walls loosely mounted upon and interlocked with said longitudinal wall structure, said transverse walls being spaced lengthwise along said longitudinal wall structure and extending on both sides of said longitudinal wall structure on either side of the longitudinal wall structure, said upper operating member having formed thereon a plurality of slots embracing the upper edges of said transverse walls, wherein the improvement comprises providing said upper operating member and said lower partition member with cooperating camming surfaces to lift said upper operating member and said transverse walls relative to said lower partition member.

6. A grid for a freezing tray including a longitudinal wall structure comprising a lower partition wall member and an upper operating member slidably mounted upon said lower member and with the adjacent edges normally in contact for relative longitudinal movement, a plurality of transverse walls loosely mounted on and supported by said longitudinal wall structure, said transverse walls being spaced lengthwise along said longitudinal wall structure and extending on both sides of said longitudinal wall structure to form compartments on either side of the longitudinal wall structure, said upper operating member having formed therein means embracing and supporting the upper portions of said transverse walls, means for moving said operating member relative to and lengthwise of said lower partition wall member to move the upper portions of said transverse walls lengthwise of said lower partition member, wherein the improvement comprises providing said upper operating member and said lower partition member with a set of cooperating cam means located between the center and each of the opposite ends of said operating member and rendered effective in response to the relative longitudinal movement of said members to separate the adjacent edges of said members and to lift said transverse walls as their upper portions are being moved longitudinally.

7. A grid for a freezing tray including a longitudinal wall structure comprising a lower partition wall member and an upper operating member slidably mounted upon said lower member and with the adjacent edges normally in contact for relative longitudinal movement, a plurality of transverse walls loosely mounted on and supported by said longitudinal wall structure, said transverse walls being spaced lengthwise along said longitudinal wall structure and extending on both sides of said longitudinal wall structure to form compartments on either side of the longitudinal wall structure, said upper operating member having formed therein means embracing and supporting the upper portions of said transverse walls, means for moving said operating member relative to and lengthwise of said lower partition walls to move the upper portions of said transverse walls lengthwise of said lower partition member from a freezing position to an ejecting position, wherein the improvement comprises providing one of the adjacent edges of said members with a cam surface and the adjacent edge of the other member with a cooperating lifting cam surface effective in said movement from a freezing position to an ejecting position for operating said members to lift said transverse walls as they are moved lengthwise in response to said relative lengthwise movement of said members.

8. A grid as defined in claim 6 in which one set of cooperating cam means has a wider longitudinal spacing than another set for sequential engagement and sequential cam lifting applied to different halves of the operating members.

References Cited

UNITED STATES PATENTS

| | | | |
|---|---|---|---|
| 2,862,370 | 12/1958 | Frei | 249—72 |
| 3,335,578 | 8/1967 | Strahan et al. | 249—72UX |
| 3,380,702 | 4/1968 | Strahan | 249—71 |

J. HOWARD FLINT, JR., Primary Examiner

U.S. Cl. X.R.

249—131, 187